(12) United States Patent
Jager (10) Patent No.: US 7,467,996 B1
(45) Date of Patent: Dec. 23, 2008

(54) MEAT PROCESSING CONVEYOR SYSTEM

(76) Inventor: Todd G. Jager, 1324 Buchanan Ave., Sioux City, IA (US) 51106

( * ) Notice: Subject to any disclaimer, the term of this patent is extended or adjusted under 35 U.S.C. 154(b) by 0 days.

(21) Appl. No.: 12/080,957

(22) Filed: Apr. 8, 2008

(51) Int. Cl.
*A22C 17/00* (2006.01)
(52) U.S. Cl. .................................................... 452/177
(58) Field of Classification Search ............... 198/597, 198/600, 817, 860.1, 861.1, 346; 83/932, 83/177, 152, 100, 102, 79; 452/177–184, 452/198
See application file for complete search history.

(56) References Cited

U.S. PATENT DOCUMENTS

| | | | | |
|---|---|---|---|---|
| 1,649,304 A | * | 11/1927 | Gray | .......................... 198/400 |
| 1,837,514 A | * | 12/1931 | Agar | .......................... 452/52 |
| 5,896,809 A | * | 4/1999 | Miller | .......................... 99/355 |
| 6,826,989 B1 | * | 12/2004 | Wattles et al. | .................. 83/102 |
| 6,983,678 B2 | * | 1/2006 | Wattles et al. | .................. 83/102 |

* cited by examiner

*Primary Examiner*—Thomas Price
(74) *Attorney, Agent, or Firm*—Dennis L. Thomte; Thomte Patent Law Office LLC (57) ABSTRACT

A meat processing conveyor system wherein a first trim conveyor belt is positioned between first and second product conveyor belts. First and second personnel conveyor belts are positioned laterally of the first and second product conveyor belts respectively. First and second personnel walkways are positioned laterally of the first and second personnel conveyor belts respectively.

20 Claims, 7 Drawing Sheets

MEAT PROCESSING CONVEYOR SYSTEM

BACKGROUND OF THE INVENTION

1. Field of the Invention

This invention relates to a meat processing conveyor system and more particularly to a meat processing conveyor system wherein a trim conveyor is positioned between a pair of product conveyors and which may also include a pair of personnel conveyors positioned adjacent the product conveyors. Still more particularly, the conveyor system of this invention may include personnel walkways, when the personnel conveyors are utilized, to enable the workers to return to the infeed end of the product conveyors after they have been moved to the ends of the product conveyors.

2. Description of the Related Art

In conventional meat processing conveyor systems wherein meat products are being cut, trimmed or removed from the original piece, a plurality of workers stand at one side or both sides of a product conveyor belt in a spaced-apart relationship and trim and remove products from an original piece of meat with each product then being placed on a conveyor which only transports that particular piece which necessarily requires several conveyors for each product being cut, trimmed or removed from the original piece of meat. In such systems, it is not possible to track the product from the beginning to the end of the processing procedure and it is difficult to track employee performance. Further, in the conventional systems it is impossible or at least difficult to set employee pace.

SUMMARY OF THE INVENTION

A meat processing conveyor system is disclosed and includes a conveyor frame means positioned on a supporting surface and having a first end, a second end, a first side and a second side. A first elongated and generally horizontally disposed conveyor belt is movably mounted on the frame means and has a first end, a second end, an upper carry belt portion, and a lower return belt portion. The first conveyor belt has a plurality of spaced-apart divider walls extending upwardly from the conveyor belt to create separate bins for different products. The first end of the first conveyor belt is positioned adjacent the first end of the frame means with the second end of the first conveyor belt being positioned adjacent the second end of the frame means. A second elongated and generally horizontally disposed conveyor belt is movably mounted on the frame means and also has a first end, a second end, an upper carry belt portion and a lower return belt portion. The second conveyor belt is positioned closely adjacent the first conveyor belt at the first side of the frame means. The first end of the second conveyor belt is positioned at the first end of the first conveyor belt with the second conveyor belt having a length which is less than the length of the first conveyor belt. A third elongated and generally horizontally disposed conveyor belt is movably mounted on the frame means and has a first end, a second end, an upper carry belt portion and a lower return belt portion. The third conveyor belt is closely positioned adjacent the first conveyor belt at the second side of the frame means so that the first conveyor belt is positioned between the second and third conveyor belts.

The conveyor system of this invention may include personnel conveyor belts and personnel walkways as will now be described. A first elongated and generally horizontally disposed personnel conveyor belt is closely positioned laterally of the second conveyor belt and has first and second ends, an upper carry portion and a lower return portion. The first personnel conveyor belt has its first end positioned adjacent the first end of the second conveyor belt and has its second end positioned adjacent the second end of the second conveyor belt. A second elongated, generally horizontally disposed personnel conveyor belt is closely positioned laterally of the third conveyor belt and has first and second ends, an upper carry portion and a lower return portion. The second personnel conveyor belt has its first end positioned adjacent the first end of the third conveyor belt and has its second end positioned adjacent the second end of the third conveyor belt.

The upper carry portion of the first personnel conveyor belt is disposed in a plane below the second conveyor belt so that personnel on the first personnel conveyor belt may have access to the carry portions of the first and second conveyor belts. The upper carry portion of the second personnel conveyor belt is disposed in a plane below the third conveyor belt so that personnel on the second personnel conveyor belt may have access to the carry portions of the first and third conveyor belts. The first, second, third conveyor belts and the first and second personnel conveyor belts are moved at the same speed.

A first personnel walkway is positioned laterally of the first personnel conveyor belt and has a first end and a second end to enable a person who is standing on and being moved by the first personnel conveyor belt between the first and second ends thereof may step from the first personnel conveyor belt at the second end of the carry portion thereof onto the second end of the first personnel walkway and walk to the first end of the first personnel walkway and then step onto the first end of the first personnel conveyor belt. A second personnel walkway is positioned laterally of the second personnel conveyor belt and has a first end and a second end to enable a person who is standing on and being moved by the second personnel conveyor belt between the first and second ends thereof may step from the second personnel conveyor belt at the second end of the carry portion thereof onto the second end of the second personnel walkway and walk to the first end of the second personnel walkway and then step onto the first end of the second personnel conveyor belt.

As the personnel are moved from the first end to the second end of the personnel conveyor belts, the workers trim, cut and process meat products which are traveling on the second and third conveyor belts. As the products are cut from the pieces of meat, the products are slid from the second and third conveyor belts into the individual bins on the first conveyor belt or are tossed into those bins by the worker. The separate products are discharged from the discharge end of the first conveyor belt onto individual conveyor belts or into separate product containers.

It is therefore a principal object of the invention to provide an improved meat processing conveyor system.

Still another object of the invention is to provide an improved meat processor conveyor system which takes up less space than conventional meat processor conveyor systems.

A further object of the invention is to provide an improved meat processing system which is less expensive to operate and is less expensive to purchase.

Still another object of the invention is to provide an improved meat processing conveyor system which costs less to maintain and which costs less to clean.

Still another object of the invention is to provide a meat processing conveyor system which enables products to be tracked and which assists in tracking employee performance.

These and other objects will be apparent to those skilled in the art.

DESCRIPTION OF THE PREFERRED EMBODIMENT

In the drawings, the meat processing conveyor system of this invention is referred to generally by the reference numeral 10. Although the system of this invention is ideally suited as a meat processing conveyor system wherein boning and trimming operations are performed, the conveyor system of this invention could also be used in other environments.

Conveyor system 10 includes a metal frame means 12 which is supported on a floor 14. For purposes of description, frame means 12 will be described as having a first end 16, a second end 18, a first side 20 and a second side 22.

The numeral 24 refers to a first elongated flat top modular conveyor belt of conventional design which has an infeed end 26 and a discharge end 28. Conveyor belt 24 is powered by a conventional electric motor 29 so that the carry portion 30 thereof travels from its infeed end 26 to its discharge end 28 and so that its return portion 32 travels from the discharge end 28 to the infeed end 26. Conveyor belt 24 is provided with a plurality of upstanding dividers 34 with either the dividers 34 being color coded to define separate bins therebetween or the conveyor belt 24 being color coded between the dividers 34 to designate separate bins into which particular items are placed such as trim, bone, etc.

Figure 1:
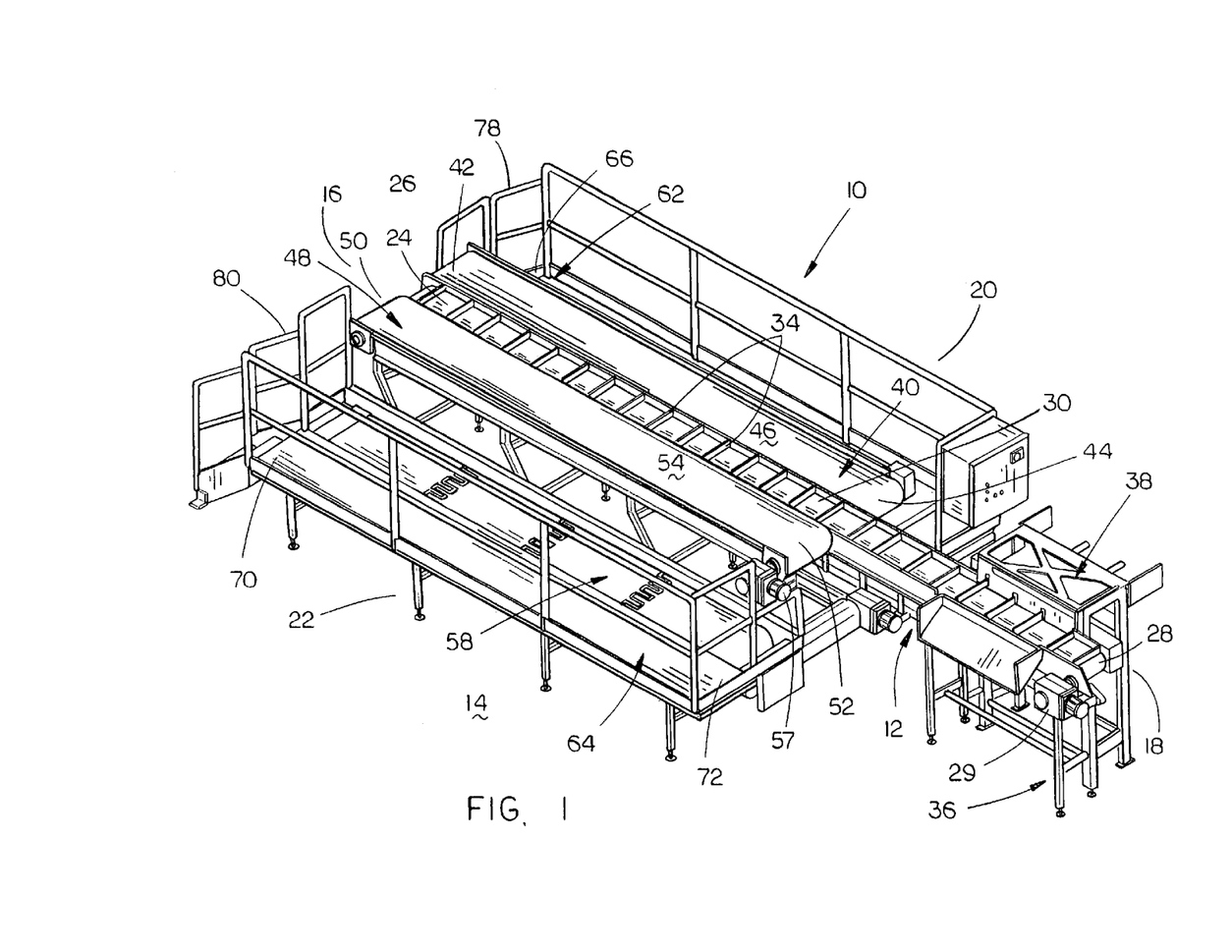
FIG. 1 is a perspective view of the meat processing conveyor system of this invention.
Figure 2:
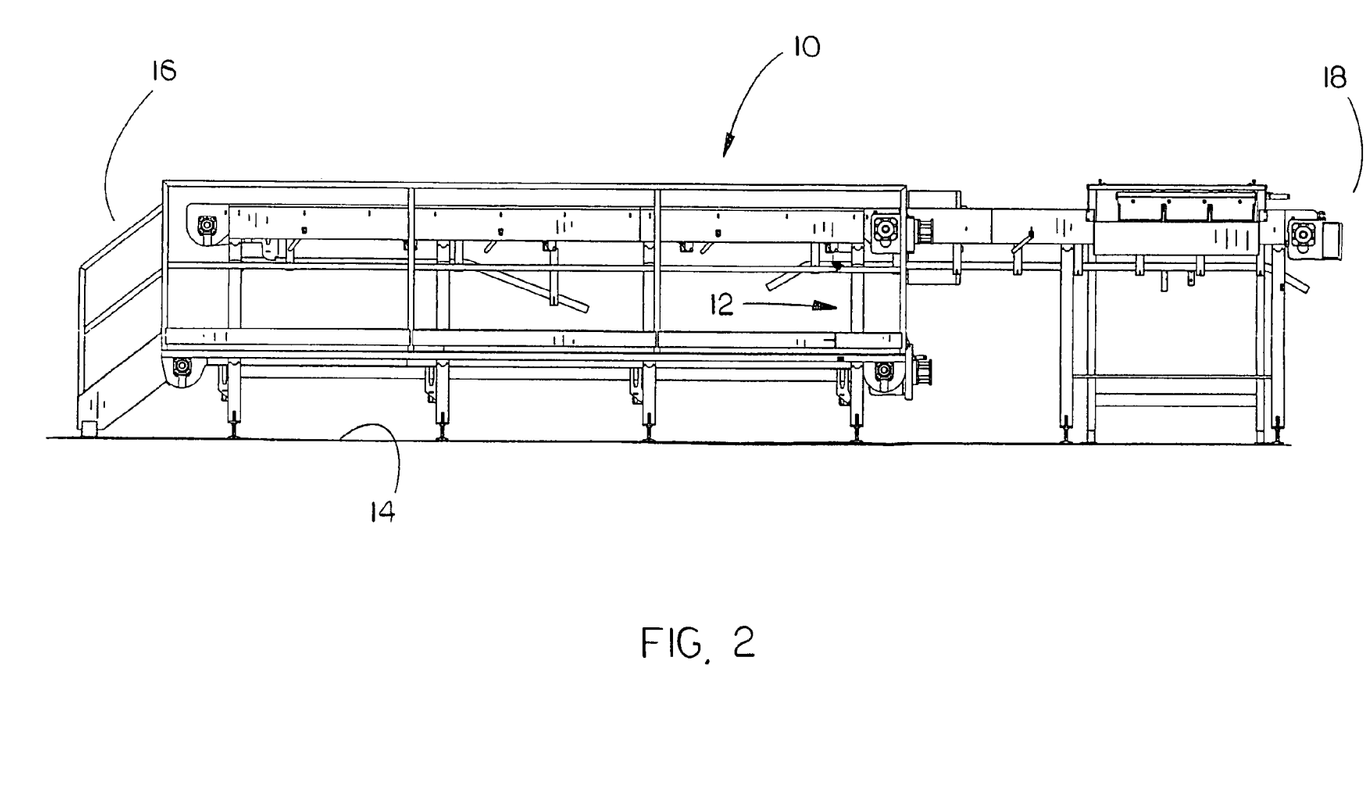
FIG. 2 is a side view of the meat processing conveyor system of this invention.
Figure 3:
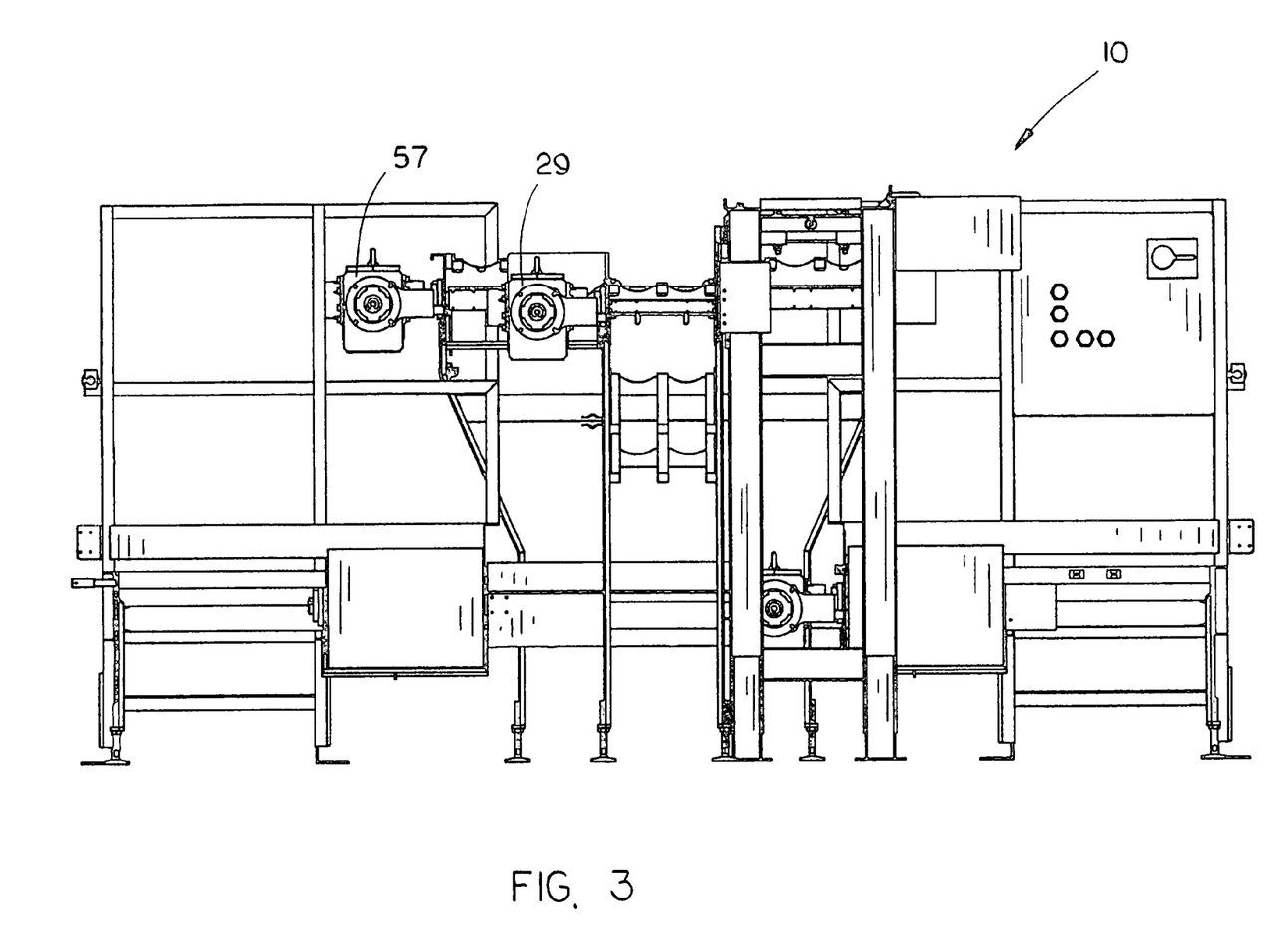
FIG. 3 is an end view of the meat processing conveyor system as viewed from the right side of FIG. 2.
Figure 4:
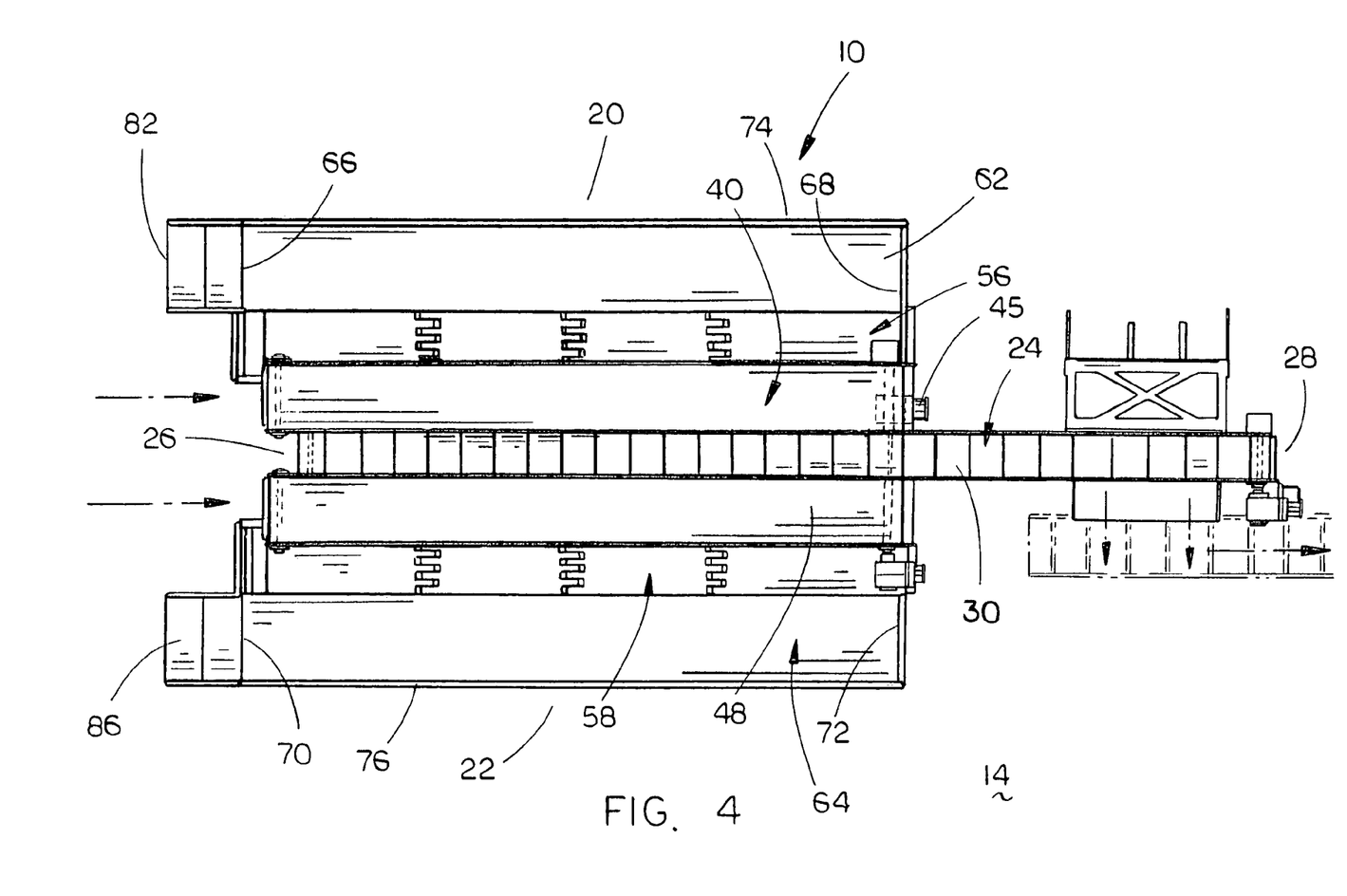
FIG. 4 is a top view of the conveyor system of this invention.
Figure 5:
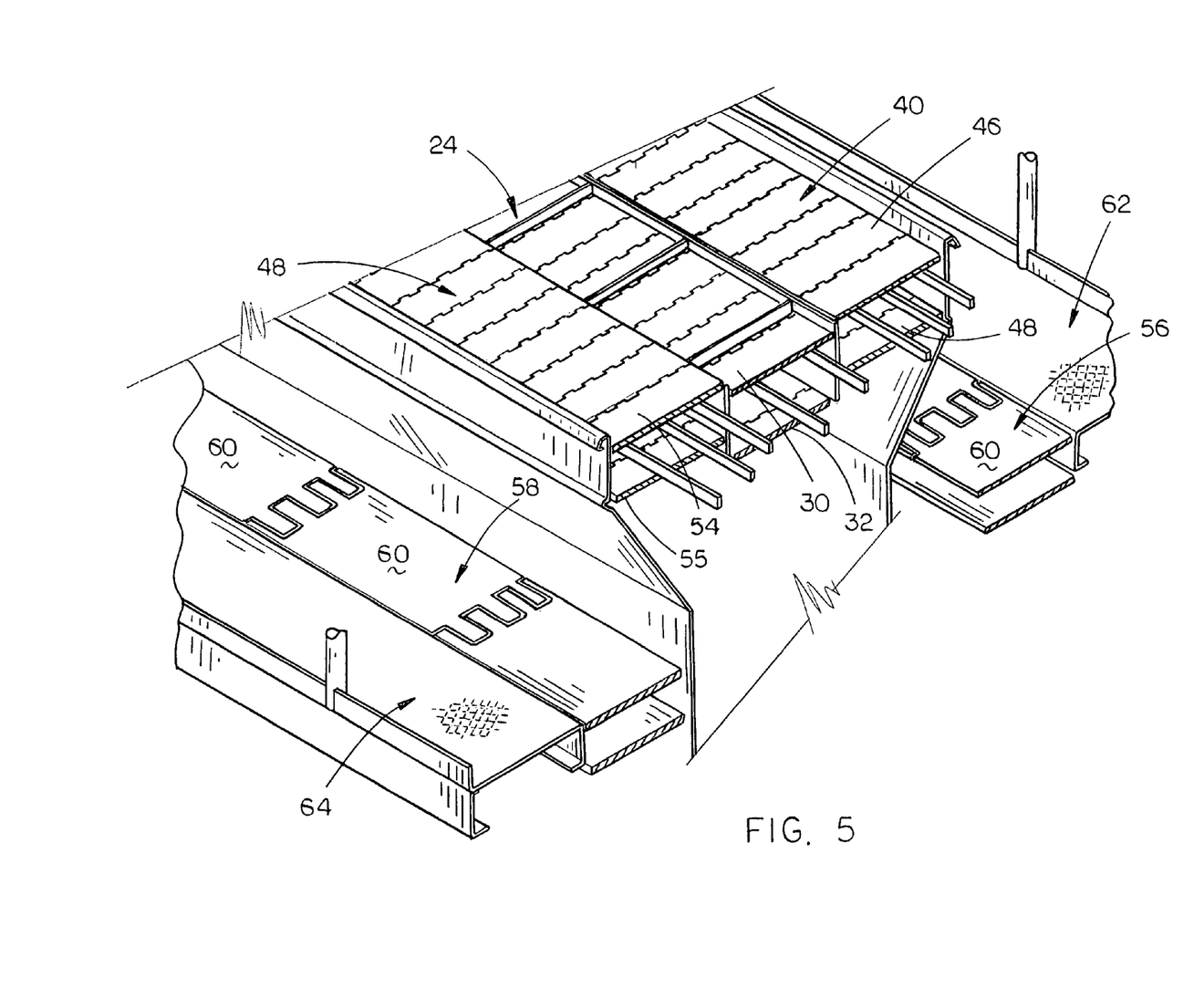
FIG. 5 is a partial perspective view of the conveyor system of this invention.
Figure 6:
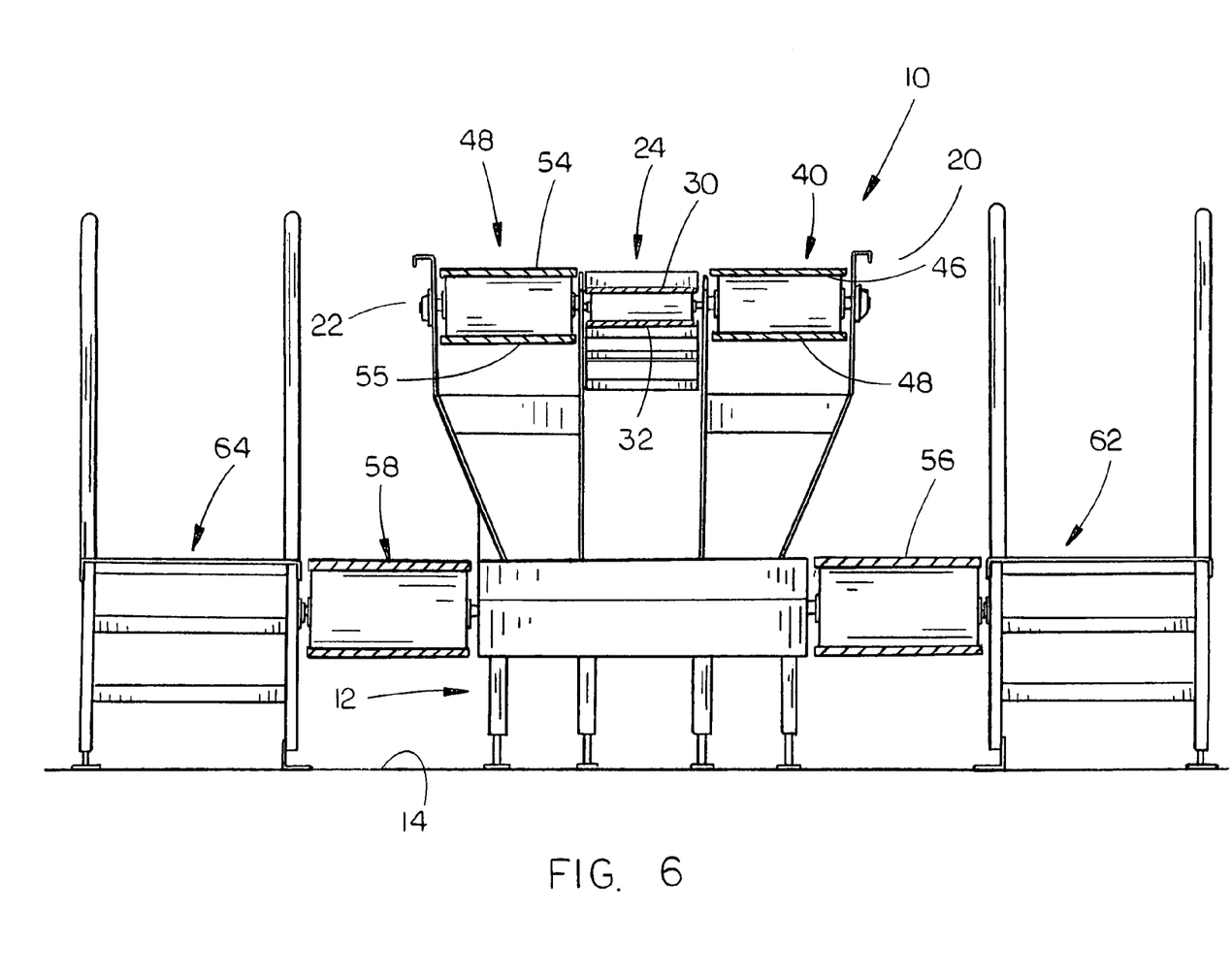
FIG. 6 is a vertical sectional view of the conveyor system of this invention.
Figure 7:
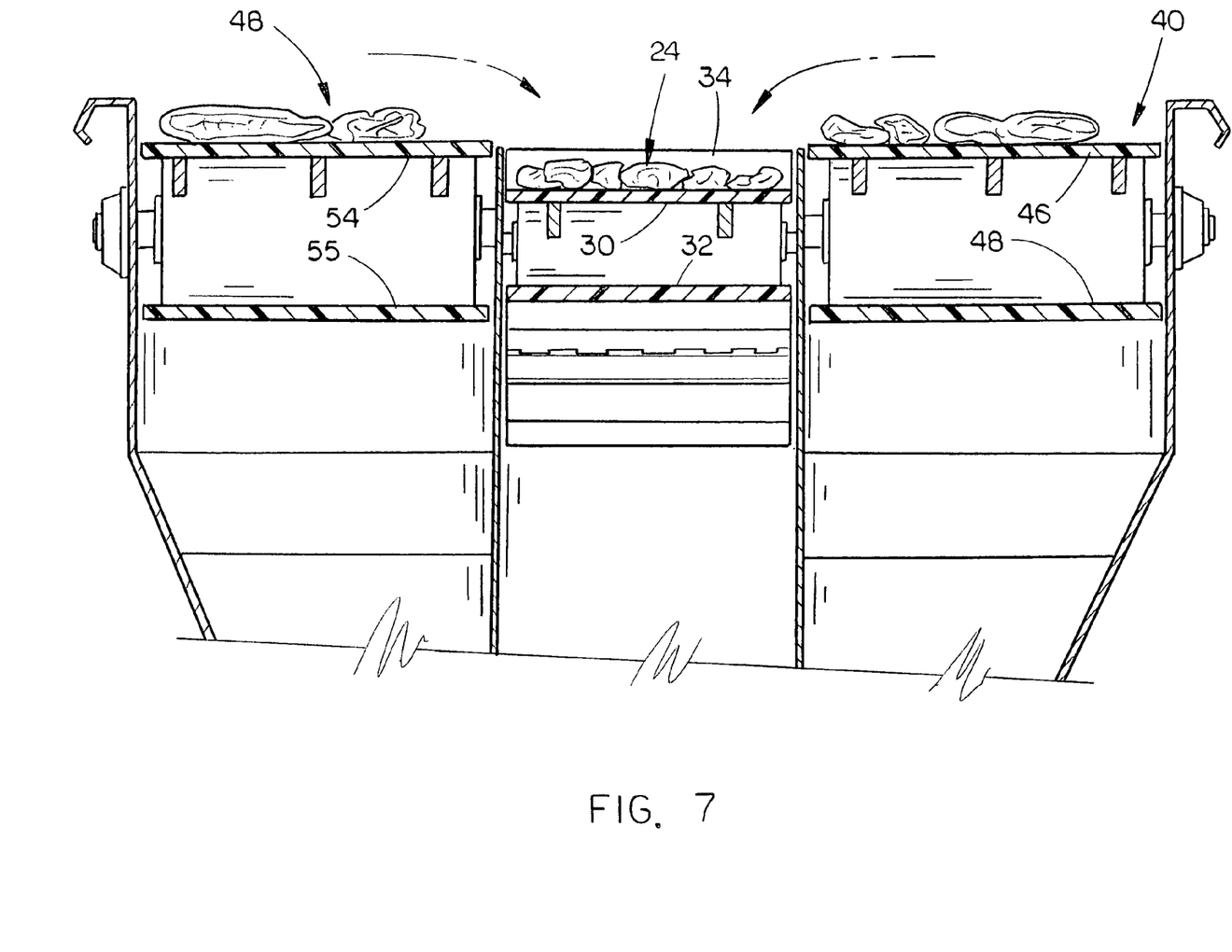
FIG. 7 is a partial vertical sectional view of the conveyor system illustrating the trim conveyor and the product conveyors at the opposite sides thereof.

FIG. 1 illustrates that the discharge end 28 of conveyor belt 24 is supported upon a frame 36 which may be a part of the frame means 12 if desired or which may be a separate frame. The numeral 38 designates a "push-off" assembly which moves transversely or laterally with respect to the conveyor belt 24 so as to push the products in the individual bins on conveyor belt 24 into separate containers or conveyors in communication therewith.

The numeral 40 refers to a second elongated and generally horizontally disposed conveyor belt which is movably mounted on the frame means 12 and which has a first infeed end 42 and a second discharge end 44 with the conveyor belt 40 being driven by a conventional electric motor 45 in conventional fashion so as to define an upper carry portion 46 which travels from the infeed 42 to the discharge end 44 and a lower return portion 48 which travels from the discharge end 44 to the infeed end 42. The conveyor belt 40 is preferably a flat top modular conveyor belt of conventional plastic design. As seen in FIG. 1, the infeed end 42 of conveyor belt 40 is positioned slightly outwardly of the infeed end 26 of conveyor belt 24. As also seen in FIG. 1, the discharge end 44 of conveyor belt 40 terminates inwardly of the discharge end 28 of conveyor belt 24. As also seen in the drawings, the upper carry portion 46 of conveyor belt 40 dwells in a plane above the carry portion 30 of the conveyor belt 24.

A third elongated flat top modular conveyor belt 48 is movably positioned on the frame means 12 closely adjacent the conveyor belt 24 on the opposite side thereof from conveyor belt 40. Conveyor belt 48 includes a first infeed end 50, a second discharge end 52, an upper carry portion 54 and a lower return portion 55. As seen in the drawings, conveyor belt 48 is driven by a conventional electric motor 57 and will normally be driven by the same electric motor that drives conveyor belt 40. The conveyor belt 48 has the same length as the conveyor belt 40 and is positioned on the frame means 12 in the same fashion as conveyor belt 40. The upper carry portion 54 of conveyor belt 48 dwells in the same vertical plane as the upper carry portion 46 of conveyor belt 40 and dwells in a vertical plane above the carry portion 30 of conveyor belt 24. The positioning of the carry portion 30 of the conveyor belt 24 below the planes of the upper carry portions 46 and 54 of conveyor belts 40 and 48 respectively creates a trough-like area above the conveyor belt 24 so it is easy for personnel to slide trim, bone, meat, from the conveyor belts 40 and 48 onto the conveyor belt 24 between the dividers 34. The conveyor belts 24, 40 and 48 are driven at the same speed.

Optional personnel conveyor belts 56 and 58 are movably positioned on the frame means 12 outwardly of the conveyor belts 40 and 48 respectively and in a plane therebelow and are driven in conventional fashion by a suitable electric motor. Preferably, the personnel conveyors 56 and 58 have spaced-apart markings thereon to designate individual personnel stations 60. The personnel conveyor belts move at the same speed as the conveyor belts 40 and 48 and move in the same direction.

Optional personnel walkways 62 and 64 are positioned outwardly of personnel conveyor belts 56 and 58 respectively and preferably dwell in the same planes as the conveyor belts 56 and 58 respectively. For purposes of description, personnel walkway 62 will be described as having ends 66 and 68 while personnel walkway 64 will be described as having ends 70 and 72. A railing structure 74 is positioned around the walkway 62 and a railing structure 76 is positioned around the personnel walkway 64 as illustrated in the drawings. Preferably, the ends 66 and 70 of walkway 62 and 64 are closed by pivotal gates 78 and 80 respectively. Stairs 82 and 86 are provided at the ends 66 and 70 of personnel walkways 62 and 64 respectively. The personnel conveyor belts 56 and 58 are driven at the same speed as the conveyor belts 24, 40 and 48.

Although the conveyor system of this convention is disclosed as including a pair of conveyor belts 40 and 48 positioned on opposite sides of the conveyor belt 24, the system could be used with only conveyor belt 40 or conveyor belt 48 and with only one personnel conveyor belt and one personnel walkway if it is desired to utilize a personnel conveyor and personnel walkway.

In operation, the conveyor belts 24, 40, 48, 56 and 58 will be activated and will move from the left to the right as illustrated in FIG. 1 and will be moved at the same speed as previously stated. Meat products will be delivered by any convenient means to the infeed ends 42 and 50 of conveyor belts 40 and 48 respectively and will be conveyed from the left to the right as viewed in FIG. 1. As the meat products are delivered to the infeed ends of the conveyors 40 and 48, a worker will step from the associated personnel walkway onto the associated personnel conveyor belt in the designated personnel station adjacent the gates. The worker will trim the meat product before him/her on the conveyor belts 40 or 48 and will be moved from the left to the right as viewed in FIG. 1 by the associated personnel conveyor. In other words, the worker will move from the left to the right with the piece or pieces of meat being processed during the movement. The worker will bone or trim the piece of meat and will place the boned or cut products in the separate products bins defined by the dividers 34. When the worker reaches the end of the personnel conveyor belt 56 or 58, the worker will step from the personnel conveyor belt onto the end 68 or 72 of walkways 62 and 64 and will then walk towards the other end of the walkway and again step onto the associated personnel conveyor belt and repeat the process.

The meat products within the individual bins defined by the dividers 34 will pass to the push-off assembly 38 which will then push the products from the individual bins on the conveyor 24 onto individual conveyors or into separate containers.

The conveyor system of this invention has many advantages over conventional conveyors used in the meat processing business. The conveyor system of this invention takes up less space than conventional systems and enhances the visibility across otherwise crowded rooms. The conveyor system of this invention is less expensive since it powers fewer motors. The conveyor system of this invention is less expensive due to the reduction in the number of conveyors. Further, the conveyor system of this invention is less expensive to maintain and requires less replacement parts and inventory. Further, there is less parts to perform preventative maintenance upon. Additionally, the conveyor system of this invention is less costly to clean due to the fact that since there is less equipment since the cleaning time, water, soap and chemicals will be reduced. Even more importantly, it is possible to track the meat products to achieve the timing of the trim conveyor with the main conveyor enables the tracking of product. Additionally, the conveyor system of this invention also assists in tracking employees. The invention enables the employer to track employee performance and to set employee pace. There are situations wherein the personnel conveyor belts and walkways will not be used. In that situation, the employee will remain in one location and will not move from one end to the other end. It can therefore be seen that the invention accomplishes at least all of its stated objectives.

The invention claimed is:

1. A meat processing conveyor system comprising:
   a conveyor frame means positioned on a supporting surface and having a first end, a second end, a first side and a second side;
   a first elongated and generally horizontally disposed conveyor belt movably mounted on said conveyor frame means and having a first end, a second end, an upper carry belt portion and a lower return belt portion;
   said first end of said first conveyor belt being positioned adjacent said first end of said conveyor frame means;
   said second end of said first conveyor belt being positioned adjacent said second end of said conveyor frame means;
   a second elongated and generally horizontally disposed conveyor belt movably mounted on said conveyor frame means and having a first end, a second end, an upper carry belt portion and a lower return belt portion;
   said second conveyor belt being positioned closely laterally adjacent said first conveyor belt at said first side of said conveyor frame means;
   said first end of said second conveyor belt being positioned adjacent said first end of said first conveyor belt;
   said second conveyor belt having a length which is less than the length of said first conveyor belt;
   a third elongated and generally horizontally disposed conveyor belt movably mounted on said conveyor frame mans and having a first end, a second end, an upper carry belt portion and a lower return belt portion;
   said third conveyor belt being closely positioned laterally adjacent said first conveyor belt at said second side of said conveyor frame means so that said first conveyor belt is positioned between said second and third conveyor belts;
   a first elongated, generally horizontally disposed personnel conveyor belt closely positioned laterally of said second conveyor belt and having first and second ends, an upper carry portion and a lower return portion;
   said first personnel conveyor belt having its said first end positioned adjacent said first end of said second conveyor belt and having its said second end positioned adjacent said second end of said second conveyor belt;
   a second elongated, generally horizontally disposed personnel conveyor belt closely positioned laterally of said third conveyor belt and having first and second ends, an upper carry portion and a lower return portion;
   said upper carry portion of said first personnel conveyor belt being disposed in a plane below said second conveyor belt so that personnel on said first personnel conveyor belt may have access to said carry portions of said first and second conveyor belts;
   said upper carry portion of said second personnel conveyor belt being disposed in a plane below said third conveyor belt so that personnel on said second personnel conveyor belt may have access to said carry portions of said first and third conveyor belts;
   said first, second, third conveyor belts and said first and second personnel conveyor belts being moved at the same speed;
   a first personnel walkway positioned laterally of said first personnel conveyor belt and having a first end and a second end to enable a person who is standing on and being moved by said first personnel conveyor belt between said first and second end thereof may step from said first personnel conveyor belt at said second end of said carry portion thereof onto said second end of said first personnel walkway and walk to said first end of said first personnel walkway and then step onto said first end of said first personnel conveyor belt;
   a second personnel walkway positioned laterally of said second personnel conveyor belt and having a first end and a second end to enable a person who is standing on and being moved by said second personnel conveyor belt between said first and second ends thereof may step from said second personnel conveyor belt at said second end of said carry portion thereof onto said second end of said second personnel walkway and walk to said first end of said second personnel walkway and then step onto said first end of said second personnel conveyor belt.

2. The meat processing system of claim 1 wherein said upper carry portions of said first and second personnel conveyor belts dwell in approximately the same plane as said first and second personnel walkways respectively.

3. The meat processing system of claim 1 wherein said upper carry portion of said first conveyor belt dwells in a plane below the planes of said upper carry portions of said second and third conveyor belts.

4. The meat processing system of claim 1 wherein said first conveyor belt has spaced-apart product dividers provided thereon.

5. The meat processing system of claim 1 wherein said first ends of said second and third conveyor belts are in communication with a source of incoming meat products.

6. The meat processing system of claim 1 wherein said first and second personnel walkways are defined by upstanding railings.

7. The meat processing system of claim 1 wherein said first and second personnel conveyor belts have spaced-apart markings thereon to define individual personnel stations.

8. A meat processing conveyor system comprising:
a conveyor frame means positioned on a supporting surface and having a first end, a second end, a first side and a second side;
a first elongated and generally horizontally disposed conveyor belt movably mounted on said conveyor frame means and having a first end, a second end, an upper carry belt portion and a lower return belt portion;
said first end of said first conveyor belt being positioned adjacent said first end of said conveyor frame means;
said second end of said first conveyor belt being positioned adjacent said second end of said conveyor frame means;
a second elongated and generally horizontally disposed conveyor belt movably mounted on said conveyor frame means and having a first end, a second end, an upper carry belt portion and a lower return belt portion;
said second conveyor belt being positioned closely laterally adjacent said first conveyor belt at said first side of said conveyor frame means;
said first end of said second conveyor belt being positioned adjacent said first end of said first conveyor belt;
said second conveyor belt having a length which is less than the length of said first conveyor belt;
a first elongated, generally horizontally disposed personnel conveyor belt closely positioned laterally of said second conveyor belt and having first and second ends, an upper carry portion and a lower return portion;
said first personnel conveyor belt having its said first end positioned adjacent said first end of said second conveyor belt and having its said second end positioned adjacent said second end of said second conveyor belt;
said upper carry portion of said first personnel conveyor belt being disposed in a plane below said second conveyor belt so that personnel on said first personnel conveyor belt may have access to said carry portions of said first and second conveyor belts;
said first and second conveyor belts and said first personnel conveyor belt being moved at the same speed;
a first personnel walkway positioned laterally of said first personnel conveyor belt and having a first end and a second end to enable a person who is standing on and being moved by said first personnel conveyor belt between said first and second end thereof may step from said first personnel conveyor belt at said second end of said carry portion thereof onto said second end of said first personnel walkway and walk to said first end of said first personnel walkway and then step onto said first end of said first personnel conveyor belt.

9. The meat processing system of claim 8 wherein said upper carry portion of said first personnel conveyor belt dwells in approximately the same plane as said first personnel walkway.

10. The meat processing system of claim 8 wherein said upper carry portion of said first carry portion of said first conveyor belt dwells in a plane below the plane of said upper carry portion of second conveyor belt.

11. The meat processing system of claim 8 wherein said first conveyor belt has spaced-apart product dividers provided thereon.

12. The meat processing system of claim 8 wherein said first end of said second conveyor belt is in communication with a source of incoming meat products.

13. The meat processing system of claim 8 wherein said first personnel walkway is enclosed by upstanding railings.

14. The meat processing system of claim 8 wherein said first personnel conveyor belt has spaced-apart markings thereon to define individual personnel stations.

15. The meat processing system of claim 8 wherein said upper carry portions of said second and third conveyor belts comprise boning and/or trimming platforms.

16. The meat processing system of claim 8 wherein said upper carry portion of said second conveyor belt comprises a boning and/or trimming platform.

17. A meat processing conveyor system comprising:
a conveyor frame means positioned on a supporting surface and having a first end, a second end, a first side and a second side;
a first elongated and generally horizontally disposed conveyor belt movably mounted on said conveyor frame means and having a first end, a second end, an upper carry belt portion and a lower return belt portion;
said first end of said first conveyor belt being positioned adjacent said first end of said conveyor frame means;
said second end of said first conveyor belt being positioned adjacent said second end of said conveyor frame means;
a second elongated and generally horizontally disposed conveyor belt movably mounted on said conveyor frame means and having a first end, a second end, an upper carry belt portion and a lower return belt portion;
said second conveyor belt being positioned closely laterally adjacent said first conveyor belt at said first side of said conveyor frame means;
said first end of said second conveyor belt being positioned adjacent said first end of said first conveyor belt;
said second conveyor belt having a length which is less than the length of said first conveyor belt;
a third elongated and generally horizontally disposed conveyor belt movably mounted on said conveyor frame mans and having a first end, a second end, an upper carry belt portion and a lower return belt portion;
said third conveyor belt being closely positioned laterally adjacent said first conveyor belt at said second side of said conveyor frame means so that said first conveyor belt is positioned between said second and third conveyor belts;
said first conveyor belt having spaced-apart dividers provided thereon.

18. The meat processing system of claim 17 wherein said first conveyor belt dwells in a plane below the planes of said second and third conveyor belts.

19. The meat processing system of claim 17 wherein said second and third conveyor belts are in communication with sources of meat products.

20. A meat processing conveyor system comprising:
a conveyor frame means positioned on a supporting surface and having a first end, a second end, a first side and a second side;
a first elongated and generally horizontally disposed conveyor belt movably mounted on said conveyor frame means and having a first end, a second end, an upper carry belt portion and a lower return belt portion;
said first end of said first conveyor belt being positioned adjacent said first end of said conveyor frame means;
said second end of said first conveyor belt being positioned adjacent said second end of said conveyor frame means;

a second elongated and generally horizontally disposed conveyor belt movably mounted on said conveyor frame means and having a first end, a second end, an upper carry belt portion and a lower return belt portion;

said second conveyor belt being positioned closely laterally adjacent said first conveyor belt at said first side of said conveyor frame means;

said first end of said second conveyor belt being positioned adjacent said first end of said first conveyor belt;

said second conveyor belt having a length which is less than the length of said first conveyor belt;

said first conveyor belt having spaced-apart dividers provided thereon.

* * * * *